United States Patent
Hankins

(10) Patent No.: US 8,524,789 B1
(45) Date of Patent: *Sep. 3, 2013

(54) PROCESSING AND USE OF WASTE LATEX MATERIALS

(75) Inventor: James Craig Hankins, Lafayette, GA (US)

(73) Assignee: C & H Services Of North Georgia, LLC, Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,434

(22) Filed: Jul. 9, 2012

Related U.S. Application Data

(63) Continuation of application No. 12/767,197, filed on Apr. 26, 2010, now Pat. No. 8,304,463.

(51) Int. Cl.
*B29B 17/00* (2006.01)

(52) U.S. Cl.
USPC .............. 521/45.5; 521/40; 521/41; 528/480; 528/484; 528/502 R; 528/502 F; 528/503; 516/9; 516/98; 428/85; 428/94; 428/95; 428/96; 428/97

(58) Field of Classification Search
USPC ................. 521/40, 40.5, 41, 46, 48, 49, 49.8; 528/480, 481, 484, 502 R, 502 A, 502 C, 528/502 F, 503; 428/57, 59, 61, 62, 85, 90, 428/91, 94, 95, 96, 97; 516/9, 98, 198
See application file for complete search history.

(56) References Cited

U.S. PATENT DOCUMENTS

| | | |
|---|---|---|
| 4,299,952 A | 11/1981 | Pingel et al. |
| 7,967,988 B1 | 6/2011 | Miller |
| 2005/0209439 A1 | 9/2005 | Bell |

*Primary Examiner* — Frances Tischler
(74) *Attorney, Agent, or Firm* — Luedeka Neely Group, PC

(57) ABSTRACT

A process for recovering waste latex material from a manufacturing plant, treating the recovered waste latex material, and subsequently utilizing the recovered and treated waste latex material in a manufacturing plant. Waste latex material is recovered and treated to provide a fine, sand-like material that is suitable for reintroduction into a latex adhesive manufacturing process.

7 Claims, 1 Drawing Sheet

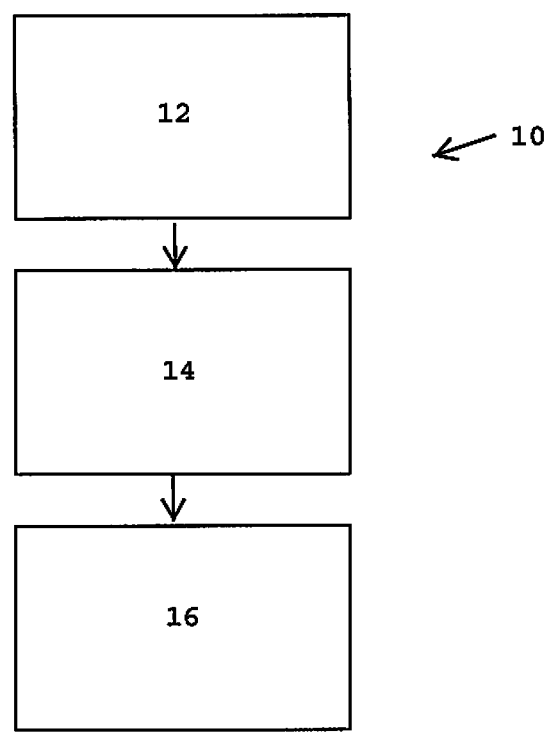

US 8,524,789 B1

PROCESSING AND USE OF WASTE LATEX MATERIALS

CROSS-REFERENCE TO RELATED APPLICATION

This application is a continuation of U.S. application Ser. No. 12/767,197, filed Apr. 26, 2010, and entitled "Processing And Use of Waste latex Materials", (now U.S. Pat. No. 8,304,463), incorporated herein by reference in its entirety.

FIELD

This disclosure relates to the recovery of waste latex adhesive. More particularly, this disclosure relates to the recovery of waste latex used in the manufacture of carpeting and the utilization of waste latex in the manufacture of carpeting.

BACKGROUND

The manufacture of carpeting typically involves sewing yarn to a primary backing and adhesively bonding the primary backing to a secondary backing. The most common adhesive used to bind the backings together is a latex adhesive such as synthetic rubber latex.

The latex adhesive used in the manufacture of carpeting is stored and maintained in various tanks, such as holding tanks and mixer tanks, associated with the manufacturing process. Over time, solids and sludges representing waste latex material accumulate in the tanks to the point that removal of the solids and sludge is required. The solids and sludge are typically removed as by use of pneumatic chisels to dislodge the solids and sludge from the tank walls, and the dislodged waste latex material is shoveled into a truck or barrels or the like for transport to a landfill.

The present disclosure advantageously provides methods for processing waste latex materials so that the waste materials may be reintroduced as a component of latex adhesive, thus representing reclamation of waste and avoidance of introduction of waste materials to landfills.

SUMMARY

The above and other needs are met by a process for recovering waste latex material from a manufacturing plant, treating the recovered waste latex material, and subsequently utilizing the recovered and treated waste latex material in a manufacturing plant.

In one embodiment, the process includes the steps of: recovering waste latex material from the manufacturing plant, including identifying a vessel in the plant having waste latex material and removing from the vessel waste latex material in the form of solids and sludge to provide recovered waste latex material.

The process also includes treating the recovered waste latex material to provide treated waste latex material having moisture content of about 2% or less water by weight and comminuting the recovered waste latex material having the desired moisture content into particles suitable for reintroduction into a latex adhesive manufacturing process. The treated recovered latex material is thereafter introduced into a latex manufacturing process.

The process of the disclosure advantageously enables a closed-loop recycling process that enables waste material that was once discarded as trash to be successfully introduced back into manufacturing processes. This represents considerable ecological advantage, as well as savings in material costs

BRIEF DESCRIPTION OF THE DRAWING

FIG. 1 is a schematic diagram having representative steps in the processing of waste latex according to the disclosure.

DETAILED DESCRIPTION

The disclosure relates to methods for recovering and processing waste latex and to reutilizing the recovered and processed latex in a manufacturing process. In this regard, the manufacture of carpet typically involves sewing yarn to a primary backing and adhesively bonding the primary backing to a secondary backing with a latex adhesive, such as a synthetic rubber latex. Tufted carpet is a common carpet type that utilizes latex adhesive.

Latex adhesives, such as synthetic rubber latexes used in the carpet industry are typically water emulsions containing a rubber, such as styrene-butadiene rubber (SBR), and a variety of emulsifying and filler materials such as, soaps, thickeners or oils, calcium carbonate, clays, and hydrated alumina fillers. Other latex materials with which the process 10 is suitable for recovering includes ethylene vinyl acetate latexes.

Latex adhesive used in the manufacture of carpeting is stored and maintained in various tanks, such as holding tanks and mixer tanks, associated with the manufacturing process. Over time, solids and sludges representing waste latex material accumulate in the tanks to the point that removal of the solids and sludge is required. The solids and sludge are removed from the tanks and loaded into a truck or barrels or the like for transport to a landfill.

However, according to the present disclosure, methods for processing waste latex materials are described which advantageously enable recovery of latex waste materials and treatment of the waste materials in a manner to enable the waste materials to be reintroduced as a component of adhesive latex. As will be appreciated, the methods according to the disclosure offer savings in the amount of raw material needed in the production of carpeting by avoiding waste. The disclosure also introduces manufacturing practices that reduce environmental impacts associated with conventional manufacturing processes by avoiding the introduction of waste materials to landfills.

With initial reference to FIG. 1, there is shown a schematic diagram having representative steps in the processing of waste latex according to the disclosure. Each step described may be a single step or a plurality of steps that together combine to represent a process step. As shown in FIG. 1, which is an overview diagram of steps of a process according to the disclosure, a process 10 for recovering and using waste latex material includes a recovery step 12, a treatment step 14, and a reintroduction step 16.

It will be understood that the process 10 may be a batch or substantially continuous process involving one or multiple manufacturing processes that utilize latex adhesive. However, to ensure compatibility of the waste latex material obtained with the reintroduction step, it is preferred that the process 10 be conducted as a batch process for each specific manufacturing process. That is, waste latex material recovered from a process is utilized with the same process from which it was recovered. This advantageously avoids introduction of undesired fillers and the like into the manufacturing process, which may occur if waste latex material obtained from different sources is utilized.

In an industrial plant, such as a carpet manufacturing plant, latex adhesives are stored and maintained in various tanks, such as holding tanks, mixer tanks, or other vessels associated with the manufacturing process. Over time, solids and sludges representing waste latex material accumulate in the tanks or other vessels. In accordance with the disclosure, this waste latex material is recovered by the recovery step 12 for subsequent treatment and reintroduction into the manufacturing process. During the recovery step 12, the waste latex material may be manually removed from tanks and the like as by use of pneumatic chisels to dislodge the solids and sludge from the tank walls, and shoveling of the dislodged material into temporary storage containers, such as barrels.

The treatment step 14 includes an initial treatment of the recovered waste latex material to reduce the moisture content to a desired amount. For example, the moisture content of the waste latex material as recovered from the manufacturing process typically ranges from about 0% to about 99% water by weight. That is, some of the material on upper portions of the tanks may be substantially dry while materials at the bottom of the tank are very wet, such that the average moisture content of the recovered material typically is about 50% or above. As part of the treatment step 14, the waste latex material obtained by the recovery step 12 is dried so that all of the recovered latex material has a moisture content of about 2% or less water by weight.

The drying step may be accomplished as by use of drying equipment and the like. However, for energy and cost savings, ambient evaporative drying of the waste latex material is preferred. The evaporative drying may be accomplished, for example, by providing a surface area where the recovered waste latex material may be spread in a relatively shallow layer, e.g., less than about 1 foot in depth and preferably shallower, and allowed to dry. The length of time required to dry the material to the desired moisture content is dependent upon the amount of material, the thickness of the material to be dried, and the ambient conditions, however. In most case, sufficient drying will occur within about 4 to 14 days. In this regard, a preferred surface area may be adjacent a heat source of the plant. Also, as precipitation, dew, and other moisture from the environment disadvantageously affects the drying step, it is preferred that a roof or other cover be available if desired due to the weather conditions. In this regard, a removable roof or cover is preferred, as exposure to sunlight is preferred if conditions are sunny.

The treatment step 14 also includes a comminution step performed subsequent to the drying step. In some case, wherein the recovered waste latex material is of sufficient dryness at the time of recovery, the waste latex material as recovered may be comminuted. In this regard, the dried recovered waste latex material typically ranges in size from pebble-size (e.g. 20 millimeters in diameter) on the low end to larger sizes approximating a large rock (e.g. 400 mm in diameter). The comminution step involves reducing the dried recovered waste material into particles of substantially uniform size suitable for reintroduction into a latex adhesive manufacturing process. In most cases, as suitable size for the comminuted recovered waste latex material is a size of about 50 mesh or below, with about 50 percent or more of the comminuted material having a size of 325 mesh or less so that the comminuted material overall resembles a fine, sand-like material. In a preferred embodiment, the comminution step involves loading the dried material into a hammer mill having various screens to control the particle size. Thus, the treated material yielded by the process 10 is a fine, sand-like comminuted material having a moisture content of about 2% or less.

A preferred comminuted material meets the criteria set forth in Table 1:

TABLE 1

| Screen size | % of material passing through screen |
|---|---|
| 325 mesh | 0-20% |
| 200 mesh | 10-40% |
| 100 mesh | 20-60% |
| 50 mesh | 50-100% |

The reintroduction step 16 involves reintroducing the recovered, dried, and comminuted waste latex material back into a latex manufacturing process. It has been observed that the material as finally rendered in the comminution step 14 is easily and readily reintroduced into latex manufacturing processes, and particularly those in which the material reintroduced represents waste material taken from the same process and treated according to the disclosure. As will be appreciated, as the comminuted material represents dry latex material of the process, sufficient water is added along with the comminuted material to provide the desired consistency. However, as the comminuted material will substantially include all the emulsifying and filler materials such as, soaps, thickeners or oils, calcium carbonate, clays, and hydrated alumina fillers, originally present in the latex material, such are also provided by the comminuted material in substantially the same proportions as present in the latex material in the tank from which the material was recovered. In the event the comminuted material was obtained from another source, an analysis may be performed to determine what, if any, additional materials need to be added to the resulting latex material to provide the desired composition.

The process according to the disclosure advantageously enables a closed-loop recycling process that enables waste material that was once discarded as trash to be successfully introduced back into manufacturing processes. This represents considerable ecological advantage, as well as savings in material costs.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A process for recovering waste latex material from a manufacturing plant, treating the recovered waste latex material so that the recovered and treated waste latex material is suitable for reintroduction in a manufacturing plant, the process comprising the steps of:

recovering waste latex material from the manufacturing plant, composing identifying a vessel in the plant having waste latex material and removing from the vessel waste latex material in the form of solids and sludge to provide recovered waste latex material; and treating the recovered waste latex material to provide treated waste latex material, the treatment consisting essentially of providing recovered waste latex material at a desired moisture content of about 2% or less water by weight and comminuting the recovered waste latex material having the desired moisture content into particles suitable for reintroduction into a latex adhesive manufacturing process.

2. The process of claim 1, wherein the recovered waste latex material comprises synthetic rubber latex materials.

3. The process of claim 1, wherein the recovered waste latex material comprises ethylene vinyl acetate latex materials.

4. The process of claim 1, wherein the recovered waste latex material has an average moisture content of above about 50% water by weight.

5. The process of claim 1, wherein the treated waste latex material is introduced into the same manufacturing, process from which the waste latex material was recovered.

6. The process of claim 1, wherein the manufacturing process comprises a carpet manufacturing process.

7. The process of claim 1, wherein providing recovered waste latex material at a desired moisture content or about 2% or less water by weight comprises drying recovered waste latex material.

* * * * *